US006834039B1

United States Patent
Kelly et al.

(10) Patent No.: US 6,834,039 B1
(45) Date of Patent: Dec. 21, 2004

(54) APPARATUS AND METHOD FOR EFFICIENT TDMA BANDWIDTH ALLOCATION FOR TCP/IP SATELLITE-BASED NETWORKS

(75) Inventors: Frank Kelly, Walkersville, MD (US); Robert Kepley, Gaithersburg, MD (US); Stan Kay, Rockville, MD (US)

(73) Assignee: Hughes Electronics Corporation, El Segundo, CA (US)

( * ) Notice: Subject to any disclaimer, the term of this patent is extended or adjusted under 35 U.S.C. 154(b) by 813 days.

(21) Appl. No.: 09/722,930

(22) Filed: Nov. 27, 2000

Related U.S. Application Data (60) Provisional application No. 60/197,246, filed on Apr. 14, 2000, and provisional application No. 60/188,375, filed on Mar. 10, 2000.

(51) Int. Cl.[7] .............................................. H01L 12/26
(52) U.S. Cl. ....................... 370/229; 370/321; 370/337; 455/453
(58) Field of Search ................................. 370/229, 321, 370/322, 337, 348, 442, 443, 468, 345; 455/450, 453

(56) References Cited

U.S. PATENT DOCUMENTS

| | | | | |
|---|---|---|---|---|
| 4,742,512 | A | | 5/1988 | Akashi et al. .................. 887/3 |
| 5,638,374 | A | * | 6/1997 | Heath .......................... 370/322 |
| 5,898,681 | A | * | 4/1999 | Dutta .......................... 370/229 |
| 6,366,761 | B1 | * | 4/2002 | Montpetit .................. 455/12.1 |
| 6,463,040 | B1 | * | 10/2002 | Dutta .......................... 370/322 |
| 6,463,059 | B1 | * | 10/2002 | Movshovich et al. ....... 370/389 |
| 6,522,638 | B1 | * | 2/2003 | Haugli et al. ............... 370/329 |
| 6,535,716 | B1 | * | 3/2003 | Reichman et al. ......... 455/12.1 |
| 6,577,610 | B1 | * | 6/2003 | Kronz ......................... 370/322 |
| 6,587,443 | B1 | * | 7/2003 | Dutta .......................... 370/322 |
| 2002/0150060 | A1 | * | 10/2002 | Montpetit ................... 370/316 |
| 2003/0032429 | A1 | * | 2/2003 | Macridis et al. ............ 455/435 |

FOREIGN PATENT DOCUMENTS

| | | |
|---|---|---|
| EP | 0 902 553 A2 | 3/1999 |
| WO | WO 00/21217 | 4/2000 |
| WO | WO 00/52849 | 9/2000 |

OTHER PUBLICATIONS

V. C. M. Leung, "Packet Reservation Protocols for Mutichannel Satellite Networks", IEE Proceedings–1, vol. 140, No. 6, Dec. 1993.

* cited by examiner

*Primary Examiner*—Frank Duong
*Assistant Examiner*—Michael J. Moore
(74) *Attorney, Agent, or Firm*—John T. Whelan

(57) ABSTRACT

A communication system balances message traffic between return channel groups and within the groups, so that the user does not control the specific transmission frequency used. Uplink frequencies and bandwidths for the return channels are set by the system in a return channel control message in the broadcast signal so as to account for system and return channel group loading, and to account for user message backlogs. An initial transmission from a remote user may be made using an ALOHA-type burst signal that provides a message backlog to the control station, and is made on a frequency determined from a randomly weighted, load-based frequency selection process. The system, and not the individual users determine the frequency and channel allocations. For large backlogs or priority users, periodic bandwidth is provided. A method for balancing loads among and between groups of return channels in the communication system includes requesting return channel bandwidth in an uplink message from a remote user to a control station. The uplink message may include a both a backlog indicator and a bandwidth allocation request provided to a Network Operations Center (NOC) which can be used to set the return channel bandwidth and frequency for the remote uplink. A user message is transmitted on the designated return channel frequency using bandwidth allocated in accordance with the backlog indicator and a bandwidth allocation request so that traffic loads are maintained in balance between established return channel frequency groups, and within each return channel frequency group.

22 Claims, 5 Drawing Sheets

FIG. 1 - (CONVENTIONAL ART)

FIG. 3
IP/DVB PROTOCOL LAYERING - "SUPERFRAME MESSAGE"

FIG. 4 - RETURN CHANNEL TRANSCEIVER

FIG. 5 - NOC RETURN CHANNEL SUBSYSTEM INTERFACE

APPARATUS AND METHOD FOR EFFICIENT TDMA BANDWIDTH ALLOCATION FOR TCP/IP SATELLITE-BASED NETWORKS

CROSS-REFERENCE TO RELATED APPLICATIONS

This application claims the benefit under 35 U.S.C. § 119(e) of U.S. Provisional Application of Kelly et al. entitled "Efficient TDMA Bandwidth Allocation for TCP/IP Satellite-Based Networks", Ser. No. 60/188,375, filed on Mar. 10, 2000, and of U.S. Provisional Application of Kelly et al. entitled "Two-way Communications System and Method", Ser. No. 60/197,246, filed on Apr. 14, 2000, the entire contents of each being incorporated herein by reference.

BACKGROUND OF THE INVENTION

1. Field of the Invention

This invention relates generally to a bandwidth allocation scheme for Time Division Multiple Access (TDMA) systems, and specifically to efficient bandwidth allocation for Transmission Control Protocol/Internet Protocol (TCP/IP) systems over a TDMA-based satellite network.

2. Description of the Related Art

Using satellites for Internet and Intranet traffic, in particular multicasting of digital video through use of Digital Video Broadcast (DVB) and two-way broadband communication has recently received a great deal of attention. Satellites can help relieve Internet congestion and bring the Internet and interactive applications to countries that do not have an existing network structure, as well as provide broadband interactive application support.

As one means of using satellite technology in this growing field, very small aperture terminals (VSATs) provide rapid and reliable satellite-based telecommunications between an essentially unlimited number of geographically dispersed sites. VSAT technology has established effective tools for LAN internetworking, multimedia image transfer, batch and interactive data transmission, interactive voice, broadcast data, multicast data, and video communications.

The Internet Protocol (IP) is the most commonly used mechanism for carrying multicast data. Examples of satellite networks capable of carrying IP Multicast data include Hughes Network System's Personal Earth Station (PES) VSAT system and Hughes Network System's DirecPC® system. Combining VSAT delivery with standards-based IP multicast ensures users a less expensive and more flexible approach to achieving high-quality, real-time broadcasting. Satellite Digital Video Broadcast (DVB) technology and the Internet Protocol (IP) have converged ("IP/DVB") to allow users transparent access to a variety of broadband content, including live video, large software applications, and media-rich web sites.

In support of these developments, VSAT systems, such as the Personal Earth Station mentioned above, allow commercial users to access one of a generally limited number of satellite return channels to support two-way communication. The choice of return or inbound channel is usually restricted to only a group of only a few of the possible channels preconfigured by a combination of hardware and/or software limitations. Some commercial systems may use a VSAT system terminal for Internet access to receive HTTP responses via the outbound satellite broadcast channel, and may send HTTP requests to the Internet through a VSAT inbound channel. Unfortunately, as these systems are mass-marketed to consumers and the number of users increases, the generally limited number of inbound channels can experience congestion and reduced user throughput as a result of an increasing number of users competing for a finite number of inbound satellite channels. The potential benefits that VSAT technology bring to consumers in the area of broadband delivery are necessarily diminished by the limited bandwidth, available on the inbound channels.

Slotted-time approaches for the uplink channels are commonly used and may be based on Time-Division Multiple Access (TDMA). TDMA is a technique for allocating multiple channels on the same frequency in a wireless transmission system, such as a satellite communication system. TDMA allows a number of users to access a single radio frequency (RF) channel without interference by allocating unique time slots to each user within each channel. Access is controlled using a frame-based approach, and precise system timing is necessary to allow multiple users access to the bandwidth (i.e. time slot access) necessary to transmit information in a multiplexed fashion on the return channel.

Transmissions are grouped into frames, with a frame synchronization ("sync") signal usually being provided at the beginning of each frame. Following the frame sync, there are a number of time "slices" within the frame for burst transmissions. In the simplest case, one time slice representing a fixed amount of bandwidth is allocated to each of the users having the need to transmit information. Each TDMA user gets a specific time slot (or slots) in the channel, and that time slot is fixed for the user during the transmission. In more complicated systems, multiple time slices are made available to users based on transmission need or a prioritization scheme. After all time slices have elapsed, another frame synchronization signal is transmitted to restart the cycle. However, even if the user has nothing to transmit, the time slot is still reserved, resulting in inefficient utilization of the available bandwidth.

TDMA requires a method for timing of the epochs of burst transmission to reduce burst overlap and consequent "collisions" of different users' transmissions. In addition, providing each remote user access to needed uplink bandwidth (essentially equivalent to slot access) becomes more difficult when sharing a larger number of different inroute or uplink channels among a large number of users. With TDMA, each VSAT accesses a control node via the satellite by the bursting of digital information onto its assigned radio frequency carrier. Each VSAT bursts at its assigned time relative to the other VSATs on the network. Dividing access in this way—by time slots—allows VSATs to make the most efficient use of the available satellite bandwidth. Like most TDM-based protocols, bandwidth is available to the VSAT in fixed increments whether or not it is needed, as discussed above. Establishing an equitable allocation of uplink bandwidth for each of the uplink or inroute users is difficult due to uneven (i.e. fluctuating heavy or light) loading within a group of uplink channels, and due to relatively uneven loading between groups of uplink channels.

Figure 1:
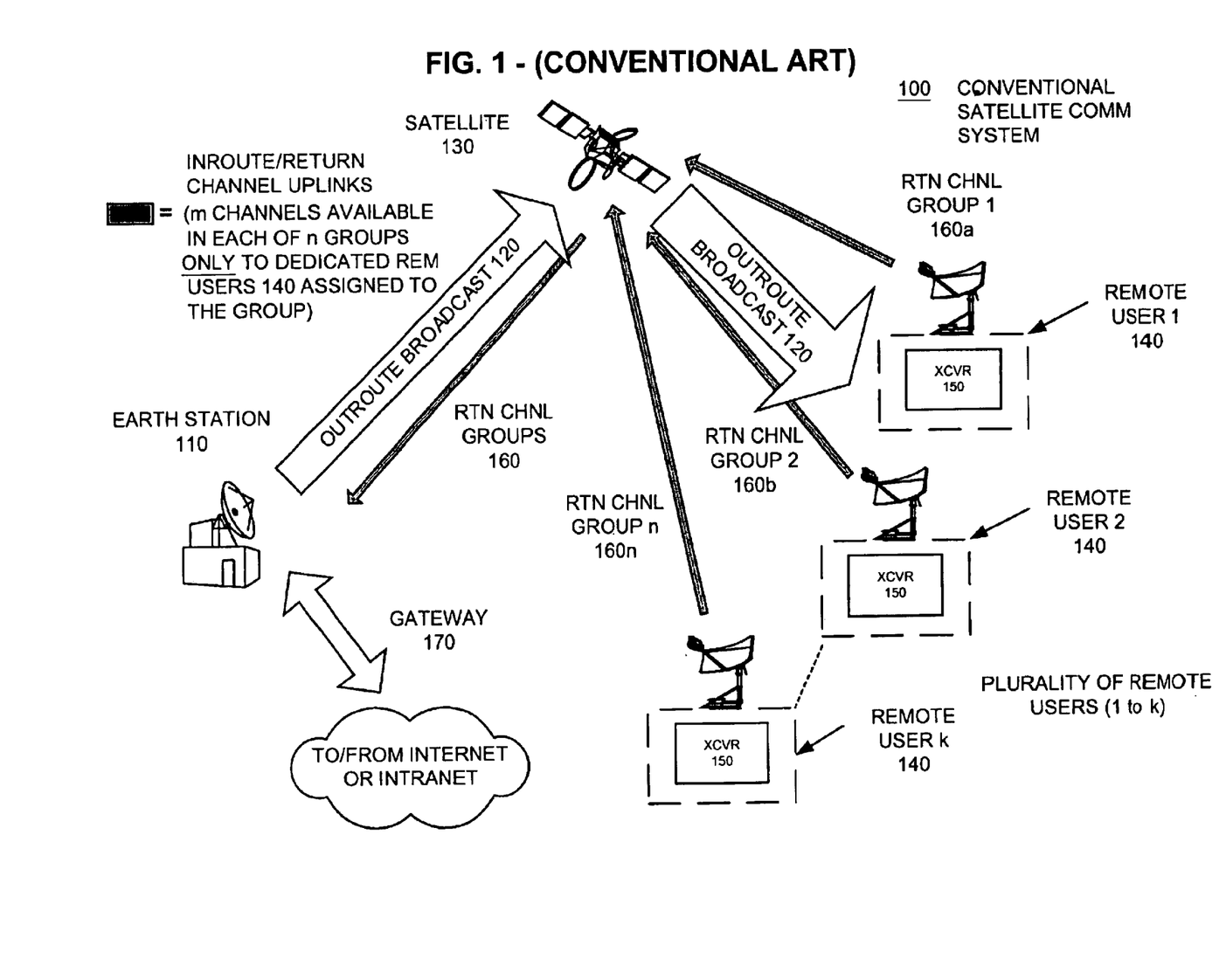
FIG. 1 depicts a conventional satellite communication system.

FIG. 1 provides an exemplary conventional satellite communication system 100 which limits each of "k" possible remote users 140 to one return channel group 160 out of "n" available groups. Each of the n return channel groups 160 could, for example, have "m" return channel frequencies available, thereby allowing each remote user to uplink on one of the m frequencies, as access is granted. Uplink timing information may be derived from transceiver 150 using the received outroute broadcast 120 transmitted by earth station 110 through satellite 130. Outroute broadcast 120 may include several information streams each received by a portion of remote users 140. Timing signals for each remote user may be derived from its associated information stream, and independent from the uplink timing information, and further may be applicable only for the return channel group 160 assigned to the particular remote user 140. In addition, internet/intranet access may be provided to remote users 140 through earth station 110 and gateway 170.

As the use of two-way satellite networks has expanded into the consumer market, industry has further pursued internetworking of multiple satellite-broadcast networks and their associated independent inroute ("inbound") or uplink channels. As the market expands, the number of possible uplink users further increases, and the previous approaches to allocation of return channel bandwidth to users in fixed, predetermined uplink channel groups necessarily requires additional hardware and system complexity in order to accommodate the increased uplink demand. If return channel groups base their frame timing on a particular satellite broadcast which is not common to all remote users across return channel groups, then users are necessarily limited to their pre-assigned return channel group, thus limiting flexibility.

Further, this approach becomes increasingly inefficient both in terms of hardware allocation, cost, and uplink channel bandwidth utilization, since many of the available groups of uplink channels may be either heavily or lightly loaded or subject to load imbalance relative to other inroute groups. This could be the result of each user being hard-configured for access to a specific inroute channel, or to only a limited number of channels, whether due to hardware or software limitations, or the frame timing considerations discussed above. This problem is exacerbated by the bursty and somewhat unpredictable nature of such transmissions, which also may result in inefficient use of the available bandwidth.

Several solutions for bandwidth allocation are available for "casual use", or non-critical uplink systems, and may be used in conventional satellite communication 100 shown in FIG. 1. For example, well-known ALOHA techniques are employed in order to minimize overhead associated with allocation of bandwidth to users when there is no data to transmit. ALOHA was developed to coordinate and arbitrate access to a shared communication channel. Although originally applied in terrestrial radio broadcasting, the system has successfully been implemented in satellite communication systems. A medium access method, such as ALOHA, is intended to prevent two or more systems from transmitting at the same time on a shared medium. There must be some method for handling so-called "collisions". In the ALOHA system, a system transmits whenever data is available to send. If another system transmits at the same time, a collision occurs, and the frames that were transmitted are lost. However, a system can listen to broadcasts on the medium, even its own, or await an acknowledgement from the destination station to determine if the frames were actually transmitted.

However, so-called pure ALOHA has about seven percent bandwidth efficiency, meaning that approximately 14 times the required bandwidth must be allocated. Further, the delays to users actually having traffic to transmit may not be acceptable in time-sensitive applications, particularly because the ALOHA technique "wastes" bandwidth, and hence time slots, on users having no or low traffic load to transmit.

The pure ALOHA technique is simple and elegant, but another method called slotted ALOHA, or random access mode, was devised to double the traffic capacity. In the slotted ALOHA scheme, distinct time slots are created in which users can transmit a single frame in a packet, but only at the beginning of a slot. Thus, the transmitter will have to buffer data until the beginning of the next slot period. For example, a control node can emit a signal at the start of each slot to let all other users know when the slot is available. By aligning frames on slots, overlaps in transmissions are reduced. However, users must wait a fraction of a second for the beginning of a time slot before they can transmit. Also, data may be lost if users contend for the same slot, but not as much data as would be lost in pure ALOHA. However, tests have shown that slotted ALOHA has a performance advantage, and is best suited for short, "bursty" messages in applications that require fast response times, such as point of sale credit card verification and ATM transaction processing. This contention technique allows VSATs to transmit at any time, and to continue transmitting if they receive acknowledgement that no other station is sending. However, this method requires that channel utilization be held to around 18 to 36 percent.

Other systems use a slot reservation access mode, wherein the host reserves slots for each user to transmit an assigned number of packets. In assigning bandwidth to match an assigned message duration, more efficient use of bandwidth is made than with the random access method, thus improving throughput. A drawback to this method is that more time is required for channel setup, adding further delay, and there may be too few or too many packets assigned for message transmission for each user, leading to at least some inefficiency in bandwidth utilization. Further, dynamic reallocation of bandwidth is not efficiently accomplished using this approach.

Even if an ALOHA-type of channel access scheme is successfully used to gain access to bandwidth for uplink, there is still the problem of either over or under-loading the return channels, and also of having an imbalance between groups of return channels.

What is needed, therefore, is an apparatus and method for dynamically assigning uplink bandwidth depending on the users' demands for return channel access. What is further needed is an apparatus and method for balancing the uplink loads between return channels sharing a common uplink channel grouping, and which also balances the system load between groups of uplink channels which share common frame timing.

SUMMARY OF THE INVENTION

The present invention solves the aforementioned problems of providing a system, apparatus, and method for assigning uplink bandwidth depending on the user's demand for return channel access, and to ensure that a load-balanced condition between and among return channel groups is maintained.

In one aspect of the invention, a control station for two-way satellite communication includes an RF section for transmitting a broadcast signal and receiving a return channel from a remoter user. A return channel subsystem includes a return channel controller to process return channel information and set a user bandwidth in the return channel. The return channel controller sets the transmit frequency and bandwidth of the return channel by evaluating either or both of a user backlog indicator and a bandwidth allocation request provided by the remote user in one or more return channel messages. The return channel controller also changes the return channel frequency within a return channel group based on traffic loading within the return channel group.

In a second aspect of the invention, a transceiver is used to transmit a frame synchronized message to a control node, and includes a receiver which detects a control node timing message in a received broadcast signal. A timing recovery section uses the control node timing message to determine a system-wide transmit frame start time, and a message buffer temporarily stores an outgoing user message until it is transmitted. A transmitter uplinks the outgoing user message during an assigned period after the transmit frame start time using an assigned transmit frequency determined by a group status message received in the broadcast signal. If necessary to achieve load balance, the transmit frequency can be changed to a different transmit frequency within a current channel group, or changed to a frequency within a different channel group, depending on the relative loading of the two return channel groups, and the remote user's bandwidth requirement, as reported in the group status message received from the broadcast signal. The ability to assign transmission to another frequency in a different return channel group results, at least in part, by sharing a common system frame timing among all return channel groups.

In a third aspect of the invention, a method for controlling a return channel from a control station includes transmitting a broadcast signal, receiving a return channel uplink from a remote user, and setting a return channel bandwidth and frequency with a return channel controller which provides an allocation message in the broadcast signal for receipt by the remote users. The return channel bandwidth and frequency are set by evaluating a backlog indicator provided by the remote user, and by evaluating the relative loads of all the return channel groups and individual transmit frequencies within the return channel groups.

In a fourth aspect of the invention, a method for transmitting a frame synchronized message from a remote user includes receiving a control node timing message in a broadcast signal, determining a return channel frame start time using the control node timing message, temporarily storing an outgoing user message, and transmitting the outgoing user message on a transmit frequency during an assigned period after the return channel frame start time. The transmit frequency and assigned bandwidth may be determined by an inroute assignment message received in the broadcast signal. The remote user may initially transmit on a return channel configured to support an ALOHA-burst signal. This burst signal includes an indication of the remote user's message traffic backlog to the control node. The remote user may then be moved to a return channel which either shares access with another remote user, or which provides dedicated uplink access, depending on available system resources and the remote user's bandwidth requirement. The initial ALOHA-burst uplink is sent on a transmit frequency selected locally by the remote user using a randomly weighted frequency selection process based on the system or group load reported over the broadcast signal.

In a fifth aspect of the invention, a communication system for balancing traffic on a plurality of return channels includes a control station to transmit a broadcast signal to a remote user. The broadcast signal includes a non real-time frame marker, a timing message, and a return channel control message. A receiver at the remote user receives the broadcast signal and determines a return channel frame start time using the non real-time frame marker and the timing message. A transmitter at the remote user uplinks a user message on one of the return channels during a predetermined period after the return channel frame start time. An uplink frequency and bandwidth of the return channel is determined by the return channel control message so as to account for system and return channel group loading, and to account for user message backlogs. An initial transmission from the remote user may be made using an ALOHA-type burst signal that provides a message backlog indication. This initial transmission may be made on a frequency determined from a randomly weighted, load-based frequency selection process in order to ensure dynamic balance between return channel groups.

In a sixth aspect of the invention, a method for balancing loads among and between groups of return channels in a communication system includes requesting return channel bandwidth in an uplink message from a remote user to a control station. The uplink message may include a backlog indicator and a bandwidth allocation request. A return channel bandwidth for the remote user may be allocated by processing the backlog indicator and a channel allocation message provided from the control station to the remote user in the broadcast signal. The channel allocation message may also allocate the return channel bandwidth. A user message is transmitted on a return channel in accordance with the channel allocation message.

The present invention in all its embodiments, collectively and individually, has a number of features that distinguish it over conventional bandwidth allocation schemes. For instance, the present invention dynamically assigns bandwidth based on how much the users actually need, and directs uplink frequency changes to balance traffic load. The approach of the apparatus, system and method of the present invention not only balances the load between return channel groups, but within each return channel group as well, ensuring an optimized bandwidth allocation scheme. The system is set up to automatically load balance every time a remote user starts a new uplink session, and accomplishes the goal of having roughly the same number of uplink users sharing each inroute channel, even with a large and increasing number of system users. This approach is particularly well-suited and optimized for TCP/IP satellite traffic, and is a highly desirable component to operating an efficient TCP/IP system over a TDMA-based satellite system, including multiple satellites networked with the required supporting ground infrastructure.

Finally, the method and system of the present invention allow expansion to an essentially unlimited number of users on the same return channels without extensive hardware and software modifications, and allows these users to all have approximately equal access to the return channel capacity, or bandwidth. This capability is brought about, at least in part, by sharing system frame timing among all return channel groups, regardless of the broadcast source of the return channel control information sent from the control station, possibly including multi-satellite links. The system preferably shares a common non-real time reference provided to all remote users, regardless of the particular broadcast being received, or its source.

These and other features and advantages of the present application will become more readily apparent from the detailed description given hereinafter. However, it should be understood that the detailed description and specific examples, while indicating a preferred embodiment of the invention, are given by way of illustration only, since various changes and modifications within the spirit and scope of the invention provided by this detailed description will become apparent to those skilled in the art.

BRIEF DESCRIPTION OF THE DRAWINGS

The features and advantages of the invention will be more readily understood upon consideration of the following detailed description of the invention, taken in conjunction with the accompanying drawings in which.

DETAILED DESCRIPTION OF THE INVENTION

A preferred embodiment of the method and system of providing return channel TDMA frequency and bandwidth allocation of the present invention is described below. Although described generally in terms of Hughes Network Systems' Two-Way DirecPC® for ease of discussion, the thrust of the communication bandwidth allocation system, apparatus, and method of the present invention could be embodied in other forms with only slight variations as to the detailed implementation. It also will be obvious to skilled artisans in the relevant art that all features of the invention will not be described or shown in detail for the sake of brevity and clarity.

The present invention is designed to control allocation of the available bandwidth of groups of return channels that share the same uplink frame timing derived across multiple transport streams. For simplicity, this two-way satellite communication system 200 is characterized in FIG. 2 as including one or more Network Operations Center (NOC) 210 (also commonly known as a "hub", "outroute", "control node", "control station", or "earth station", etc.), at least one satellite 230 having uplink and downlink transponders, one or more (i.e., 1 to k) remote users 240, each at a user node and having a satellite receive and transmit capability provided by an associated transceiver 250, which provides an integrated uplink (or "return channel") capability. Transceiver 250 may transmit on one of a plurality (i.e. "n") of return channel groups 260, which, for example, may each have "m" channels or frequencies available for uplink.

Figure 2:
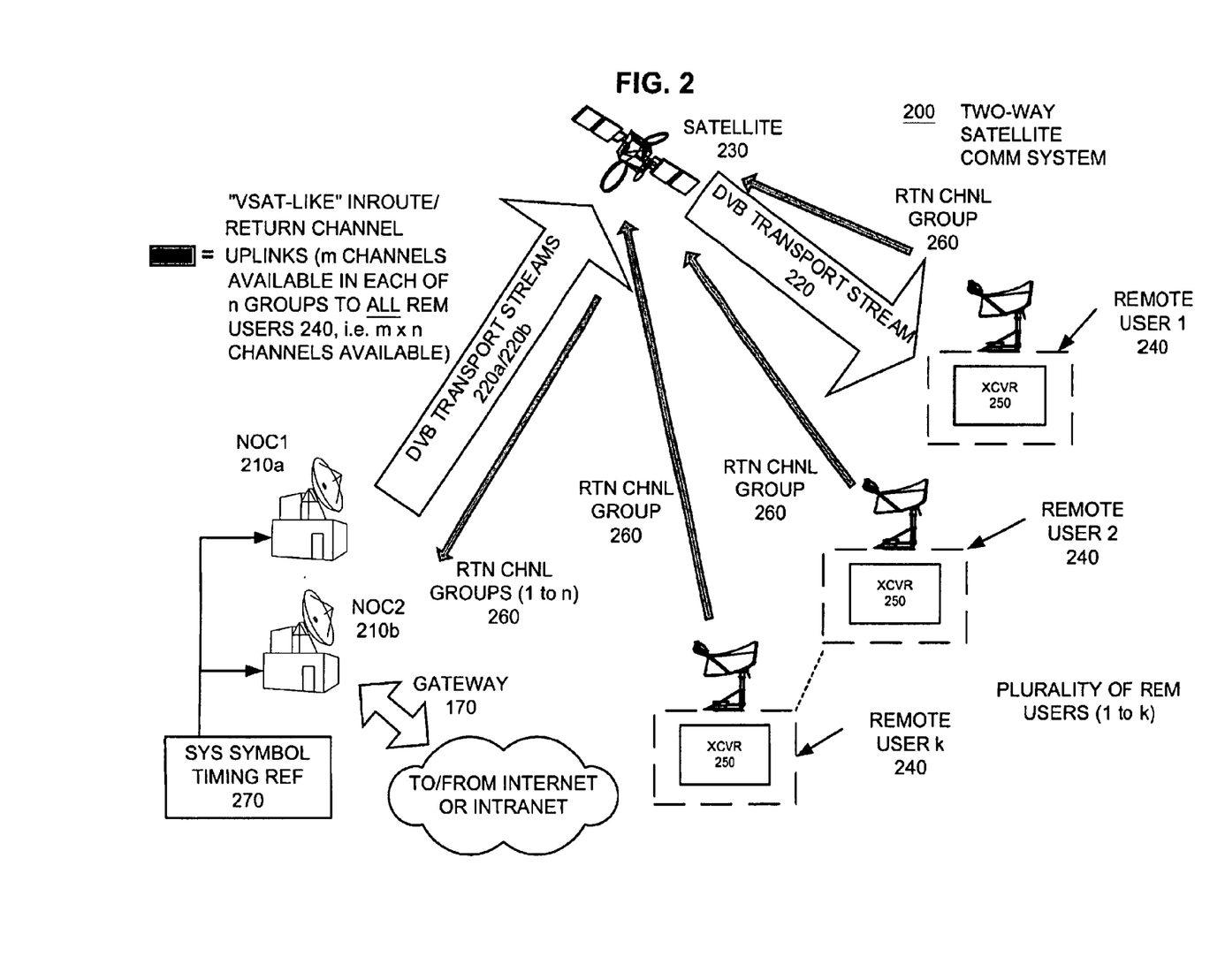
FIG. 2 shows the two-way satellite communication system of the present invention.

Thus, compared to conventional transceiver 150 in FIG. 1, transceiver 250 potentially has more uplink frequencies available, that is, "m×n" frequencies instead of only "m", due to the ability of two-way satellite communication system 200 to access any of the return channel groups 260, and the limitation of conventional transceiver 150 to only the "m" channels available on its assigned return channel group.

FIG. 2 also illustrates two NOCs 210, i.e. NOC1 210a and NOC2 210b, which each provide at least one DVB Transport Stream 220 (e.g. 220a and 220b) to satellite 230 for further retransmission. The DVB transport stream retransmitted from satellite 230 is shown merely as DVB transport stream 220 for clarity. Each NOC 210 in the system of the present invention may provide support for several receive or outroute channels. System symbol timing reference 270 preferably provides common symbol timing to each NOC 210 in the system, so that timing information used for deriving uplink frame start times may be recovered by all remote users 240. NOC 210 also preferably provides access to the internet or an intranet through gateway 170.

However, application of the method and system of the present invention is not intended to be limited to a system having a specific number of NOCs 210 or remote users 240. Further, NOC 210 in FIG. 2 is distinguished from NOC 110 in FIG. 1 by each NOC 210 having the ability to support receiving and processing return channel traffic from remote users 240 which is transmitted in accordance with a common system timing scheme.

A receive channel in transceiver 250 could, for example, operate at a rate of 48 Mbps, and the transmit channel in transceiver 250 is preferably a VSAT-like TDMA channel. Depending on consumer requirements, the channel rates for the transmit, "return, or "inroute" channel could be, for example, 64 kbps, 128 kbps, 256 kbps, or possibly even higher, as consumer needs arise. A group of multiple transmit channels may also be shared among several independent DVB transport streams 220, whether transmitted from the same or different NOC 210. The return channel also preferably contains a link-layer protocol, at the burst level, to provide for a substantially lossless channel.

Figure 3:
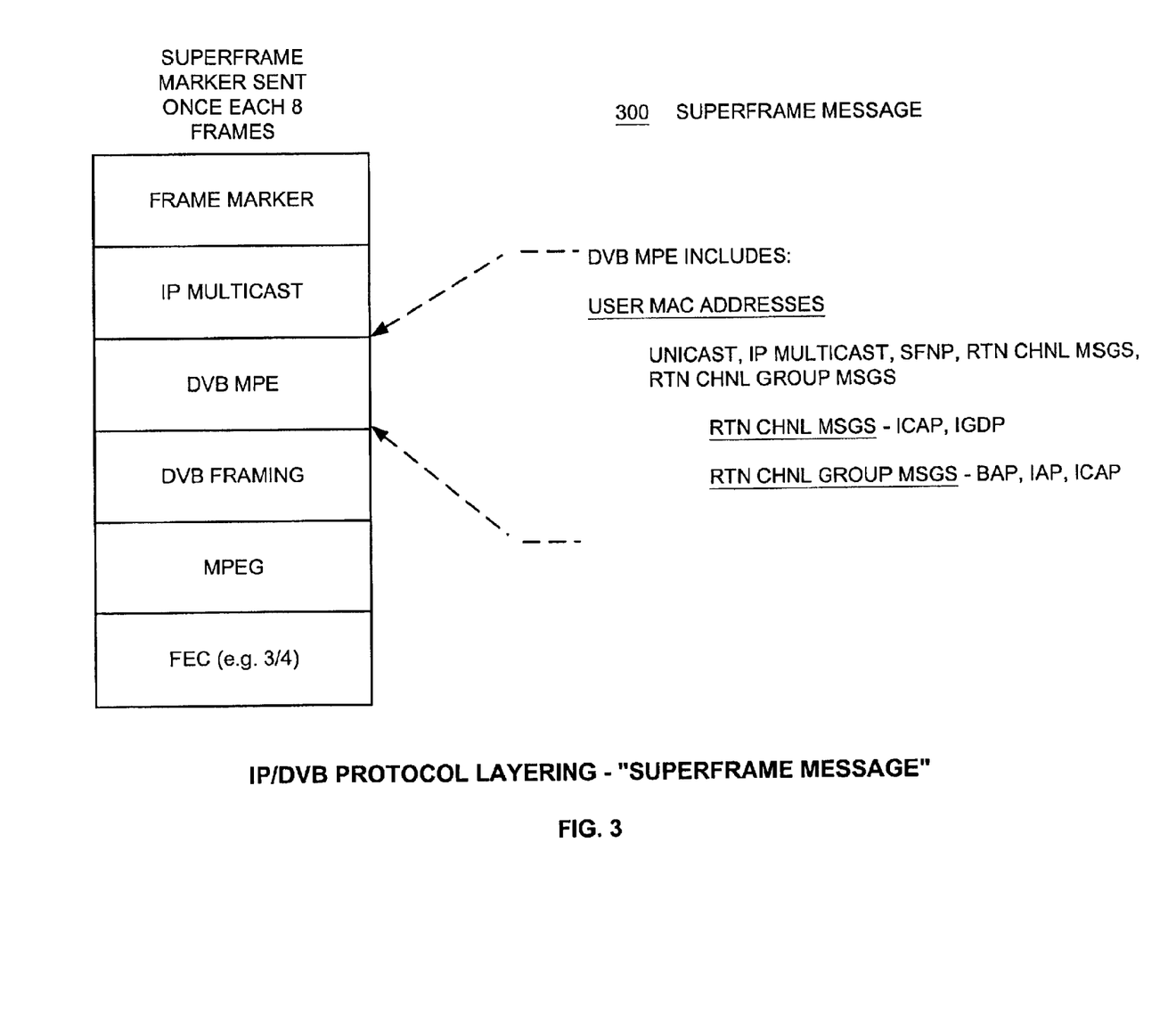
FIG. 3 shows the preferred IP/DVB protocol layering used in the present invention.

The receive channel in transceiver 250 receives a DVB transport stream 220 from NOC 210 which preferably uses an IP packet format which may include packets arranged in accordance with the Multiprotocol Encapsulation (MPE) standard. A preferred superframe message 300 is depicted in FIG. 3, wherein a superframe marker is periodically transmitted. However, the superframe marker may be transmitted only every integral number of frames, such as every eight frames, for example. The stream preferably has DVB compliant MPEG-2 formatting which supports multiple MPE messages in a single MPEG frame. The transport stream may include fixed-size 204 byte MPEG packets, which could contain 188 bytes of user traffic and 16 bytes of forward error correction (FEC) data, for example.

Preferably, an MPE header may also include specific media access control (MAC) data fields to indicate the type of media or traffic contained in the data stream, e.g., superframe numbering packet (SFNP), unicast, multicast, conditional access, return channel messages, or return channel group messages, and other data fields to indicate, for example, whether the packet is encrypted. Forward error correction (FEC) at various rates may also be supported, e.g. FEC rates of ½, ⅔, ¾, ⅚, or ⅞. Further, the header of each frame may also contain a Packet Identifier (PID) to distinguish between elementary streams in the DVB transport stream 220 so that remote user 240 may filter the message by PID. For ease of discussion, DVB transport stream 220 will be referred to hereinafter simply as "broadcast".

As for the main thrust of the present invention, allocation of bandwidth and frequencies to the return channels as well as system monitoring and control functions may be carried out by use of a series of messages contained in various bytes of the broadcast stream transmitted to remote users 240.

For example, the DVB MPE protocol layer preferably provides for MAC fields which support various user MAC addresses as discussed above. In particular, return channel messages preferably include inroute command/acknowledgement packet (ICAP) messages and inroute group definition packets (IGDP). Return channel group messages preferably support bandwidth allocation packets (BAP), inroute acknowledgement packets (IAP), and ICAP packet messages. These packets may all use User Datagram Protocol (UDP) datagrams, which utilize a transport protocol supported by the TCP/IP protocol architecture, and which support a connectionless transport service for unicast and multicast transmissions between UDP endpoints. Each of these message packets is discussed in further detail below, and in the tables provided.

Figure 4:
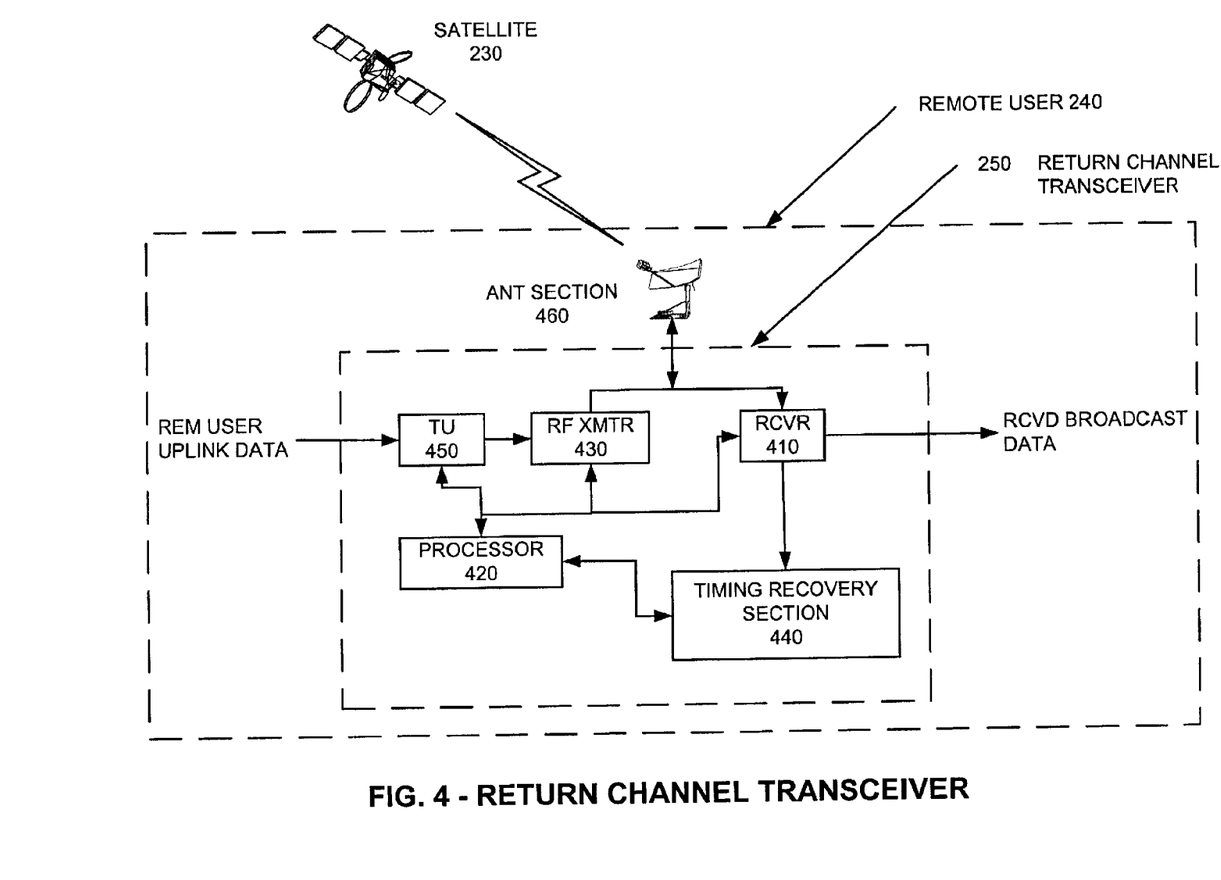
FIG. 4 provides a block diagram of a preferred return channel transceiver.

Turning to FIG. 4, transceiver 250 preferably supports TCP/IP applications, e.g. web browsing, electronic mail and FTP, and also multimedia broadcast and multicast applications using IP Multicast, e.g. MPEG-1 and MPEG-2 digital video, digital audio and file broadcast. Transceiver 250 provides a high-speed, over-the-air return channel as an alternative to a low-speed terrestrial return channel. Transceiver 250 contains receiver (RCVR) 410, processor 420, RF transmitter (RF XMTR) 430, timing recovery section 440, and Transmit Unit (TU) 450. RF XMTR 430 modulates and transmits, preferably in burst mode, the in-bound carrier to satellite 230 and NOC 210. RF XMTR 430 may operate with, and be controlled by TU 450 and RCVR 410 via processor 420, which also could master RCVR 410 by use, for example, of a universal serial bus (USB) adapter (not shown). Configuration parameters and inbound data from processor 420 may be input to RF XMTR 430 through a serial port (not shown), and transmitter status information from RF XMTR 430 may also be provided through the serial port to processor 420. TU 450 conditions the outgoing data signal by incorporating the appropriate signal protocols and modulation scheme, e.g. IP/DVB protocol and TDMA using QPSK techniques, incuding Offset-QPSK (OQPSK).

RCVR 410 receives broadcast 220 from satellite 230 through antenna section 460, and recovers and provides appropriate timing-related signals to timing recovery section 440. Timing recovery section 440 corrects or compensates the time of receipt of the received frame marker in accordance with timing information contained in the received broadcast signal, for example, in a SFNP. Timing recovery section 440 further enables RF XMTR 430 through processor 420 and TU 450 to transmit at the appropriate time in accordance with a TDMA time-slot allocation scheme. Finally, antenna (ANT) 460 propagates and receives signals to from satellite 230.

Figure 5:
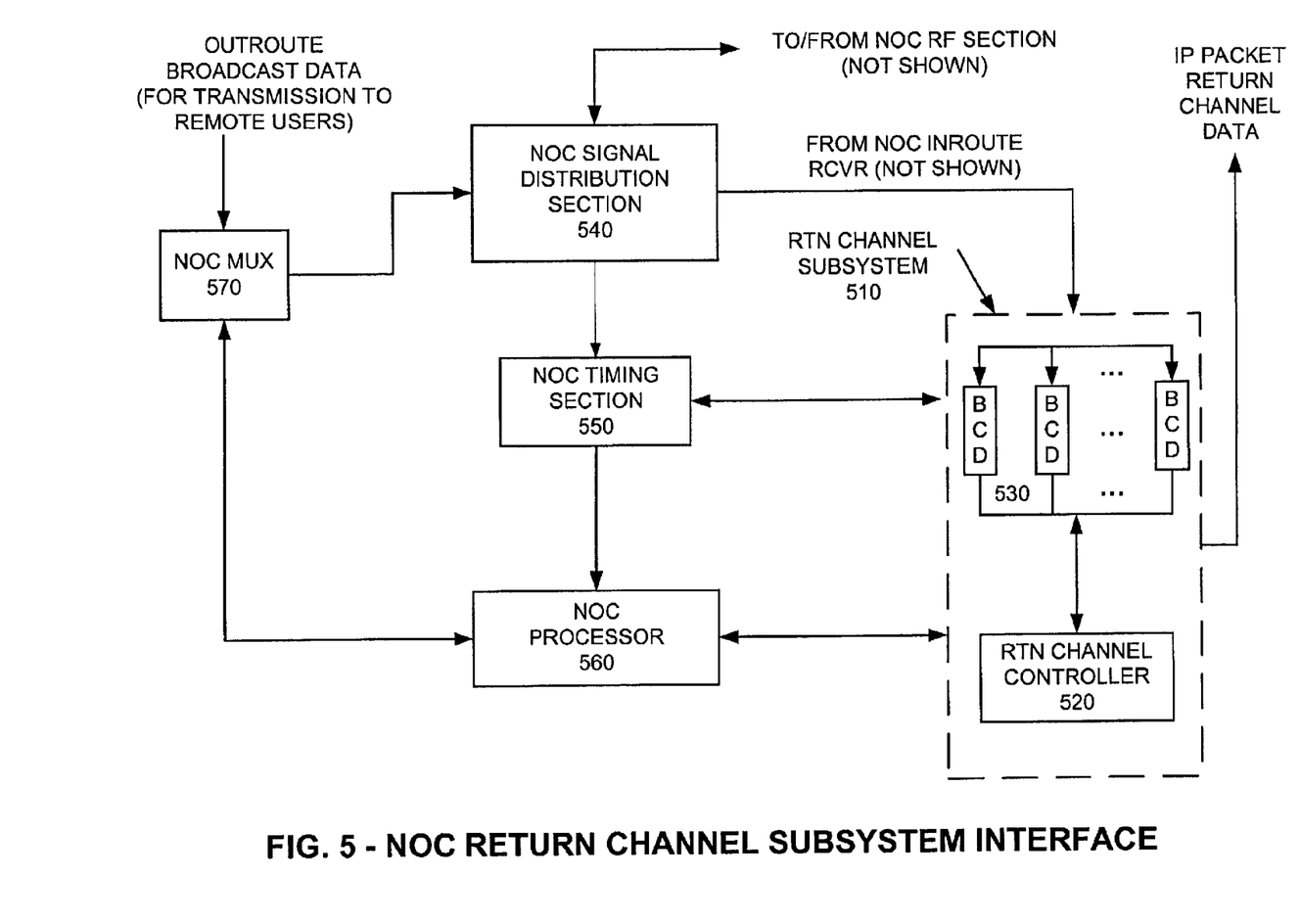
FIG. 5 provides a diagram of the NOC return channel subsystem interface.

A discussion of the nature, approach and operation of the bandwidth and frequency allocation system and method of the present invention follows. FIG. 5 shows some of the interfaces within NOC 210. Return channel subsystem (RCS) 510 in NOC 210 interfaces with NOC signal distribution section 540, NOC timing section 550, and NOC processor 560. Among other functions, RCS 510 reassembles packets received from remote users 240 over the return channels and a NOC inroute receiver (not shown) into IP packets for further processing. Non real-time frame timing transmitted in the broadcast stream to remote users 240, and ultimately used for uplink timing in the return channels, is derived from a pulse from return channel controller 520 in RCS 510. Return channel controller 520 also allocates bandwidth, coordinates the aperture configuration, and sends framing pulses to burst channel demodulators (BCD) 530. The number of BCDs 530 supported by RCS 510 is preferably at least 32 arranged to allow redundant equipment support for at least 28 return channels. Multiple sets of return channel subsystems 510 may be provided in a networked cluster arrangement (not shown) within each NOC 210 to allow for processing of a large number of return channels; preferably up to 100,000 or more, for example. Return channel traffic from the remote users provided from the NOC RF section (not shown) and the NOC inroute receiver (also not shown) and routed through NOC signal distribution section 540 is applied to one or more BCD 530 to demodulate return channel data received from the remote users, as directed by return channel controller 520.

In addition, return channel controller 520 provides framing pulses to NOC timing section 550. NOC timing section 550 preferably includes appropriate means (not shown) to measure and compare packet delays associated with both internal NOC delays and NOC-satellite delays, respectively. NOC timing section 550 also preferably functions as a "delay tracker" to ascertain and update the aforementioned delays. These delays may be determined from signals provided both from internal system timing signals and the broadcast signal as "echoed" or received from satellite 230.

NOC timing section 550 provides the appropriate frame timing information to NOC multiplexer section (NOC MUX) 570 through NOC processor 560. NOC MUX 570 combines broadcast data intended for the remote users 240 with frame timing information from NOC timing section 550, and provides a packetized data signal to NOC signal distribution section 540 for transmission to satellite 230 through the NOC RF section (not shown), and ultimately to remote users 240. Remote users 240 use the broadcast frame timing information to derive their own uplink frame start time which is preferably synchronized throughout two-way satellite communication system 200.

The equipment, signals, and subsystems within each of NOC 210 and transceiver 250 are preferably interconnected via one or more local area networks (LAN) (not shown) and, even more preferably, are interconnected in accordance with an open system architecture approach which allows modifications and upgrades to be more easily accomplished as improvements in software and hardware become available or desirable.

The underlying timing approach of the present invention which allows bandwidth and frequency allocation to take place across a large number of return channels on different return channel groups is to provide information to RCVR 410 so that transceiver 250 may precisely time its burst transmission time as an offset of the received superframe header. The superframe header received in a superframe numbering packet (SFNP) transmitted in the broadcast is used by every remote user 240 to synchronize their transmit start of frame marker to the superframe marker pulse generated by return channel controller 520. This superframe numbering packet (SFNP) is used to lock network timing for the return channels, and as a beacon to identify which network is being connected to This packet is transmitted on the "Superframe Number Packet" MAC address (see Table 1). However, receipt of the SFNP by itself is not sufficient because there are delays from the time that return channel controller 520 generates the superframe header until the time receiver 410 actually receives the SFNP.

Further correction is applied by receiver 410 to account for the internal NOC outroute delay, a NOC-satellite transmission time delay, and a transmission delay from the satellite to each of the specific remote users 240, preferably based on known parameters determined during a standard satellite-user "ranging" process during system initialization, and on additional timing information provided from NOC 210 in broadcast 220.

Thus, once every superframe, an internal NOC delay between the time the previous superframe header was supposed to have been sent, and the time that it actually was sent is broadcast in a SFNP message to all remote users 240. This value, along with a "space timing offset" (STO) related to the transmission delays from NOC 210 to remote user 240, is used by each remote user 240 to calculate the actual start time of the superframe. Remote user 240 uses the calculated superframe start time as the TDMA uplink frame time reference point for determining an upcoming transmit frame start time. Preferably, the internal NOC delay is routinely updated by NOC Timing section 550, and is thereafter also broadcast in a subsequent SFNP message to remote users 240.

Knowing the synchronized uplink frame start time, and preferably sharing the same uplink frame start time among all remote users 240, allows NOC 210 to efficiently control bandwidth allocation and frequency assignments among all remote users 240, both between and within all return channel groups 260.

The operation of the communication timing system of the present invention will now be described. NOC 210 takes formatted data packets and transmits them on the DVB transport stream 220 to satellite 230 for further retransmission to remote users 240. The data stream or "payload" information is transmitted following an appropriately formatted MPE header and initialization vector, if the packets are encrypted.

Included in the DVB transport stream 220 is the SFNP which provides a superframe marker, as well as the internal NOC delay and satellite drift correction for a previous superframe marker transmitted in a prior SFNP.

When remote user 240 receives a SFNP at their respective RCVR 410, the received superframe packet is adjusted by timing recovery section 440 at remote user 240 to determine its upcoming uplink transmission time such that the transmitted or uplink frame is received at the proper time at NOC 210. The time at which the site preferably must transmit is a satellite hop before the time that NOC 210 expects the data to be received. The transmission time may be measured by starting at a time later than the regenerated superframe time by the STO. The NOC delay and the receiver-satellite delay are subtracted from this timebase. A final adjustment to account for satellite drift is then made. Then, knowing the fixed frame length, e.g. 45 ms, the frame start time of a subsequent uplink transmit frame can be determined.

Once the frame timing is determined, a nominal value, e.g. close to 45 ms, will preferably be used on a continuing basis with minor adjustments to account for drifts between the counter and the timing pulse. Once TU 450 is aligned, there are only small corrections necessary to keep TU 450 synchronized to NOC 210.

Initially, if remote user 240 needs to uplink message traffic, access is preferably requested on one of a pre-designated set of ALOHA burst channels. Remote user 240 preferably has different states wherein it may or may not be able to transmit messages. The states of receiver 410 in transceiver 250 may include:

1) Acquisition: Receiver 410 acquires broadcast 220. During this time, transceiver 250 is unable to transmit, and uses the SFNP for acquisition.
2) Learning Mode: Receiver 410 learns about the available return channel groups by receiving the IGDP messages (see Table 2). Remote user 240 will only use a return channel if its TU 450 and RF XMTR 430 are available.
3) Ranging: If the remote user 240 has not set up its timing from its current location, it will request a ranging session from NOC 210 by sending a ranging request via a ranging burst. A closed-loop process is used to fine tune timing and power.
4) Request Bandwidth: Once the site has been ranged and data is to be transmitted, an ALOHA burst is used to transmit the data. A backlog indicator will be used to trigger NOC 210 to allocate bandwidth.
5) Send Traffic: Remote user 240 sends user traffic via an allocated return channel in one of return channel groups 260 using allocated "stream" bandwidth, i.e. bandwidth which essentially dedicates the entire TDMA transmit frame to remote user 240.

The IGDP packet (see Table 2) is preferably used to define the return channels in a return channel group 260 and their availability, and to allow selection of return channel groups for user traffic (using ALOHA for the setup) and ranging. Return channel groups may also be used to allow for load sharing between a number of return channels, and to minimize NOC 210 outroute bandwidth required to control the return channel bandwidth allocation. Return channel groups preferably limit the amount of information that needs to be cached or processed by receiver 410. The IGDP is preferably sent on the return channel broadcast MAC address.

The IGDP preferably uses one packet per return channel group per superframe, for example, 26 kbps of bandwidth for 75 return channels per group, and 300 return channels. It may also be transmitted on an "All RCVR" Multicast address.

Each receiver 410 preferably monitors all IGDPs. Receiver 410 preferably filters out return channel types that it is not configured to support, and may time out the definition if not received for three superframe times. An inroute group table is preferably created in each receiver 410 from information contained in all of these packets. This table is preferably almost static in order to minimize the overhead processing in processor 420 required to reorganize its inroute group table. Minimizing table changes is desirable to reduce potential disruptions to system 200 operations. When remote user 250 is active, i.e. has bandwidth, it preferably monitors its currently assigned inroute group, as well as a second inroute group near the time it is moved between inroute groups.

In order to limit latency when any of remote users 240 need to transmit, all inactive transceivers 250 with valid ranging information may make a random weighted selection, e.g. every 4th frame time (in the superframe), between all the inroute groups that advertise a non-zero ALOHA Metric. Remote user 240 will preferably start to monitor that inroute group, and the previous inroute group will also preferably be monitored until all previous BAPs have been received, or lost. By making such a random weighted selection, the possibility of suddenly making a lightly-loaded uplink channel heavily loaded is reduced if multiple remote users 240 should need uplink access at roughly the same time.

First, transceiver 240 may randomly select two of the ALOHA channels over the next configured number of frames for the inroute group it has selected. A reasonable assumption is that the ALOHA burst configuration is generally static over time, and that the ALOHA burst channel will be available. When remote user 240 needs to go active, and has no outstanding ALOHA packets, it may pick a random number of frames. Ignoring any frame times that had no bandwidth available from above, transceiver 250 preferably transmits a single burst during the randomly selected frame time, and waits to be acknowledged. If it is not acknowledged, or the acknowledgement is lost, it may repeat the sending of the ALOHA packet up to a number of retries indicated in the SFNP, using a so-called "diversity ALOHA" approach.

The ICAP packet (see Table 3) may be used along with the DVB MPE protocol MAC addressing scheme for, among other reasons, explicitly acknowledging ALOHA bursts by using acknowledgement packets sent preferably, for example, on an inroute group's multicast address, to reduce NOC 210 outroute bandwidth. Tables 3 a through 3d provide a variety of message acknowledgement types which are preferably supported by the system and method of the present invention.

While the ALOHA packet is outstanding, i.e. awaiting acknowledgement, transceiver 250 preferably monitors up to three inroute groups, i.e. one for an ALOHA Acknowledgement, one for a new inroute group to try, and one for the previously assigned inroute group, for example, in case a late acknowledgement or other message type is transmitted late on the previously assigned inroute group.

After receipt of an acknowledgement, the bandwidth allocation packet (BAP) is preferably used to define the current bandwidth allocation for all inroutes associated with an inroute group. Each frame, receiver 410 may receive another BAP from the inroute group on which it is currently expecting to receive bandwidth. In order to be able to transmit data and process acknowledgements, receiver 410 may need to scan the entire inroute group table to derive the following fields it may need:

1) Inroute Group—Since receiver 410 can be monitoring 2 inroute groups, it will preferably confirm the inroute group based on the MAC address of the packet, and only process the BAP for which it expects to use bandwidth.

2) Inroute Index—This is the cumulative burst offset per slot size of a frame, and may be used as an index into the frequency table of the IGDP.

3) Frame Number—This field may come directly from the frame number field of the packet.

4) Burst Id—This may be the 4 least significant bits of an index into the Burst Allocation Table in the BAP (see Table 4).

5) Burst Offset—The Cumulative Burst Offset preferably starts at 0, and increases with the each burst size. The Burst Offset is preferably the Cumulative Burst Offset MOD Slot Size of a frame (i.e., modulus division).

6) Burst Size—This field may come directly from the Burst Allocation Table, and will preferably never cross a frame boundary.

7) Acknowledgement Offset—This is the Index into the Burst Allocation Table of the entry.

Preferably, the IDGP may use one packet per inroute group per frame, or 535 kbps of bandwidth for 25 active users per inroute, 75 inroutes per group, and 300 inroutes, for example. Since it is preferably transmitted on the inroute group's multicast address, each receiver 410 will only have to process 134 kbps. To attempt to ensure that active users do not have performance impacted, or data lost by any load balancing at a return channel subsystem 510, observation of the following rules by remote user 240 is desirable:

1) At least five frames prior to moving remote user 240 to a different inroute group, but on the same return channel subsystem 510, remote user 240 must be notified, so that it can begin to monitor both inroute group streams, and will need to continue monitoring both streams until all outstanding inroute acknowledgement packets (IAP) are received, or have been lost. See below and Table 5 for a description of IAP.

2) There should be at least one frame time having no bandwidth allocated between bursts that are assigned to different inroutes. This is to ensure that remote user 240 will be able to fill all it's assigned slots, and still have at least one frame time for tuning to the new frequency. This requirement preferably applies to bursts that are defined across consecutive BAPs, and when moving between inroute groups on the same RCS 510.

3) There preferably should be at least one complete frame with no bandwidth allocated between normal and ranging bursts. This is to ensure that transceiver 250 will be able to fill all it's assigned slots, and still have at least one frame time for tuning and adjusting transmission parameters.

4) After the BAP that moves remote user 240 to a different inroute group is sent, RCS 510 will continue to receive bursts under the old inroute group for a time in excess of the round trip delay. RCS 510 preferably accepts and acknowledges these frames, and remote user 240 should continue to monitor acknowledgements from the old inroute group.

5) Remote user 240 should not have its bandwidth moved to a different inroute group while it is still monitoring a previous inroute group it has just been moved from.

6) Transceiver 250 will preferably only be assigned multiple bursts during a single frame time if they are all on the same inroute, and are all back to back in the frame, but without the burst overhead of turning RF XMTR 430 on and off for each packet.

7) All of the bursts, except the last, preferably are large enough for the maximum sized packet (largest multiple of the slot size≦256, for example), but only the first will have burst overhead aperture included in it's size.

8) Once an AssignID (see Tables 3a–3d) is assigned to a transceiver 250 on an inroute group, it will not change while the transceiver remains active, except as part of being moved between inroute groups.

9) Once an AssignID is assigned to a transceiver 250 on an inroute group, it preferably should be left fallow for five superframe times after it is no longer in use.

The inroute acknowledgement packet (IAP) in Table 5 is preferably used to explicitly acknowledge each inroute packet for assigned bandwidth with a valid cyclic redundancy code (CRC), regardless of the presence of any encapsulation data, to allow for faster recovery of inroute packet errors. ALOHA and non-allocated ranging packets are acknowledged explicitly (see Table 5). The IAP preferably uses one packet per inroute group per frame, or approximately 57 kbps of bandwidth for 25 Active Users per inroute, 75 inroutes per group, and 300 inroutes, for example. Since the IAP is preferably transmitted on the inroute group's multicast address, each receiver 410 will only have to process approximately 15 kbps. If the IAP is lost, the transceiver 250 may automatically retransmit the packet. The loss of the IAP for a particular inroute group could be detected by the next IAP packet received, or if no IAP is received for four frame times, for example.

As for return channel message transmissions, the burst data frame has specific structures for ALOHA bursts (i.e. non-allocated bandwidth), and when bandwidth is allocated. Examples of the different types of packet headers preferably used for these two data frame structures are provided in Tables 6 and 7, respectively. Two different header structures can be used to maximize efficiency of the allocated bandwidth messages, by minimizing the size of required message headers. RCS 510 can detect the type of burst from the frame numbering information in the packet header.

The inroute packet format may consist of a variable size header and 0 or more bytes of encapsulated datagrams. The encapsulated datagrams are sent as a continuous byte stream of concatenated datagrams, preferably with no relationship to inroute packetization. Proper interpretation requires reliable, in-order processing of all data bytes, preferably only once. To resolve problems due to data loss on the inroute, a selective acknowledgement, sliding window protocol may be used. As is the case for such sliding window protocols, the sequence number space should be at least twice the window size, and data outside the window is dropped by the receiver.

For allocated streams, i.e. where bandwidth has been allocated to a remote user 240 (see Table 7), inroute burst data will preferably be retransmitted if not acknowledged in the IAP for that frame number, or if that acknowledgement is lost. If synchronization problems occur, RCS 510 can force transceiver 250 to be inactive by removing its bandwidth allocation. This preferably causes transceiver 250 to reset its sequence number and datagram counter to 0, and start at the beginning of a new datagram. Since the sequence number is preferably reset every time transceiver 250 goes active, any data sent in ALOHA or non-allocated ranging bursts may be duplicated due to retransmissions, if the acknowledgement is lost, and also due to diversity Aloha, discussed previously.

When back to back bursts are allocated to the same transceiver 250, it preferably does not turn off the unit, and will use the saved overhead associated with burst processing to deliver extra "payload", or user message traffic. This will help maintain a desired 1 to 1 mapping of allocated bursts to packets.

In the system, apparatus and method of the present invention, and with a preferred remote user and return channel addressing scheme, there is essentially no limitation on the number ("s") of remote users 240 which may uplink data on a return channel. A minimum of $2^{24}$ (~16 million) transceivers are preferably supported by the addressing scheme embodied within the DVB stream and, even more preferably, up to $2^{28}$ (~256 million) transceivers are supported.

Further, because the return channel is preferably a substantially lossless channel, compression techniques may effectively be employed to reduce bandwidth requirements. IP header compression has the potential to give a tremendous improvement in bandwidth, since such compression eliminates 10–15 bytes for every IP packet.

While a preferred embodiment has been described above in terms of a TDMA bandwidth or slot allocation approach, this preferred embodiment is in no way to be considered limiting, and is provided only by way of example. As a further example, the method and system of providing bandwidth and frequency allocations can be accomplished across any type of communication system having multiple users sharing the same media, and may find particular application in any slotted-time system that requires bit timing, e.g. a frequency-time system using a phase-locked loop (PLL) or frequency-locked loop (FLL) based upon the same timing standard. In addition, although the present invention provides benefits to using TCP/IP applications, the system, apparatus and method of the present invention is not limited to this choice of protocols.

It will be obvious that the present invention may be varied in many ways. Such variations are not to be regarded as a departure from the spirit and scope of the invention, and all such modifications as would be obvious to one skilled in the art are intended to be included within the scope of the following claims. The breadth and scope of the present invention is therefore limited only by the scope of the appended claims and their equivalents.

TABLE 1

Superframe Numbering Packet (SFNP) Format

| Bits | Field | Description/Notes |
|---|---|---|
| 8 | Frame Type | A value of 1 indicates a SFNP (Super Frame Numbering Packet) |
| 1 | Timing Source | Used to distinguish which unit generated this SFNP. |
| 32 | SFNP Interval | This result indicates the elapsed time between this Super Frame pulse and the previous pulse and allows RCVR 410 to adjust for any differences between it's local measurement clock and a clock used by NOC timing units. If a clock used by NOC time units has high accuracy, RCVR 410 will only need to receive 3 consecutive SFNP to be able to interpret this field. |
| 32 | SpaceTiming-Offset (STO) | This is approximately the number of msec between an outroute superframe pulse and the time that the first frame from the superframe will be received at the NOC. |
| 4 | Aloha Backoff | This is the number of frames (minus one) for an initial random backoff for the ALOHA transmission. |
| 4 | Aloha Retries | This is the number of times (minus one) that a packet retransmission is attempted using the initial random backoff before Processor 420 may abort transmission. |
| 16 | Aloha Max Backoff | After the Aloha Retries have been exceeded, the transmission may be aborted, but RCVR 410 may continue to attempt to recover in the background. |

TABLE 2

Inroute Group Definition Packet (IGDP) Format

| Bits | Field | Description/Notes |
|---|---|---|
| 8 | Frame Type | A value of 2 indicates an inroute group Definition Packet |
| 7 | Inroute Group ID | Identifier for each inroute group. This must be unique across all inroute groups that are available to a set of NOC Outroutes. |
| 5 | Frequency Offset | This field is the offset into the packet (in 16 bit words) of a Frequency Table (not shown). |
| 4 | Return channel Type | Indicates the type of Return channels that are defined in this group. Example values for OQPSK with Convolutional Encoding are: (0–64kbps, 1–128k, 2–256k) |
| 16 | Bandwidth Metric | This metric is used for random weighted selection of a Return channel Group when going active. It may be based on a ratio of the number of return channels available for user traffic to the active number of users, and may also be used to ensure that users are evenly distributed between inroute groups. A value of zero indicates an unavailable inroute group, or no ALOHA defined for this group. |
| Nx24 | Frequency Table | This is the Frequency used to transmit on each of the Return channels in the Group. Changing the Frequency for a Return channel should be carefully coordinated to avoid interruptions of network operation, or transmission on the wrong Return channel frequency around the switch over point. There could be, for example, an upper bound of no more than 4,000 return channels between all Return channel Groups for an Outroute. The upper bound for the number of return channels in each Return channel Group, could be based on a limit of the number of Burst Allocations in the Bandwidth Allocation Packet (BAP). The value of N may be derived from the length of the IP Datagram. If an inroute is not used, then its bandwidth will be |

TABLE 2-continued

Inroute Group Definition Packet (IGDP) Format

| Bits | Field | Description/Notes |
|---|---|---|
| | | allocated to a reserved AssignID from the BAP. The frequency may be encoded as: Frequency = 14 GHz + value × 100 Hz. |

TABLE 3

Inroute Command/Acknowledgement Packet (ICAP)

| Bits | Field | Description/Notes |
|---|---|---|
| 8 | Frame Type | A value of 5 indicates an Inroute Command/Acknowledgement Packet |
| 5 | Number of Entries | This is the number of entries in the Offset Table. |
| 16 | Frame Number | For Acknowledgments, this is the Frame Number that is being acknowledged. For Commands, this is the Frame Number the Command will take effect on. |
| Nx10 | Offset Table | This is a table of offsets wherein each of the variable sized Command/Acknowledgement fields begin. The size should be known based on the Command field, but can also be derived from the Offset for the next Entry, or from the size of an IP datagram for the last entry. Each offset may be a 10-bit value, and starts from the beginning of the Offset Table. The value of N is the Number of Entries. |
| Nx8 | Command/Acknowledgment | This is a list of Commands or Acknowledgments defined in Tables 3a–3d. No more than 1 Command or Acknowledgment can preferably be sent per Packet. A value of N may be derived from the IP Datagram length. |

TABLE 3a

Aloha Acknowledgement

| Bits | Field | Description/Notes |
|---|---|---|
| 26 | SerNr | This is the Serial Number of RCVR 410, for example, or other unique remote user identifier. |
| 5 | Command | A value of 1 indicates an Aloha Acknowledgment; only one diversity aloha packet will preferably be acknowledged on the inroute group's multicast address. |
| 7 | Inroute Group ID | The inroute group, where future bandwidth will be allocated to remote user 240. The Inroute Type for this group should be the same type that was used in the Aloha packet. |
| 16 | AssignID | This is an Id that may be used in future Bandwidth Allocation Packets, where future Bursts will be allocated. A value of 0 could acknowledge the data without assigning any bandwidth. |

TABLE 3b

Disable/Enable TU Command

| Bits | Field | Description/Notes |
|---|---|---|
| 26 | SerNr | This is the Serial Number of RCVR 410, for example, or other unique remote user identifier. |
| 5 | Command | A value of 2 indicates a Disable/Enable TU Command - When disabled, RCVR 410 will not transmit again until it is explicitly enabled from NOC 210. This setting may be stored in nonvolatile memory in RCVR 410. This command |

TABLE 3b-continued

Disable/Enable TU Command

| Bits | Field | Description/Notes |
|---|---|---|
| | | preferably is sent on the "All RCVR" multicast address. There may be no acknowledgement to this command. |
| 1 | Enable | Set to "1" if enable, set to "0" for disable. |
| 16 | AssignID | This is an Id that may be used in future Bandwidth Allocation Packets, where future Bursts will be allocated. |

TABLE 3c

Go Active Command

| Bits | Field | Description/Notes |
|---|---|---|
| 26 | SerNr | This is the Serial Number of RCVR 410, for example, or other unique remote user identifier. |
| 5 | Command | A value of 4 could indicate a "Go Active" Command, for example. RCVR 410 may look for allocated bursts on the specified inroute group and transmit on the ones allocated to it. This command is only accepted if RF XMTR 430 is inactive, and has already successfully ranged for the Inroute Type. This command is preferably sent on the All RCVR multicast address. This command may also be implicitly acknowledged by the act of transmitting. |
| 7 | Inroute Group ID | This is the inroute group where future bandwidth will be allocated. |
| 16 | AssignID | This is an Id used in future Bandwidth Allocation Packets, where future Bursts will be allocated. |

TABLE 3d

Change Inroute Group Command

| Bits | Field | Description/Notes |
|---|---|---|
| 26 | SerNr | This is the Serial Number of RCVR 410, for example, or other unique remote user identifier. |
| 5 | Command | A value of 5 could indicate a Change inroute group Command - This is only accepted, if remote user 240 is active. This command is preferably sent on the inroute group's multicast address, and is implicitly acknowledged by the act of using the new inroute group. |
| 7 | Inroute Group ID | This is the inroute group where future bandwidth will be allocated. The Inroute Type for this group must be the same type that is currently in use. |
| 16 | AssignID | This is an Id used in future Bandwidth Allocation Packets, where future Bursts will be, allocated. A value of 0 can be used to force an RF XMTR 430 to go inactive, but the preferred method is to remove it's bandwidth allocation. |

TABLE 4

Bandwidth Allocation Packet (BAP) Format

| Bits | Field | Description/Notes |
|---|---|---|
| 8 | Frame Type | A value of 3 indicates a Bandwidth Allocation Packet |
| 16 | Frame Number | This indicates the Frame Number that is allocated in this packet, and is preferably larger than the current Frame Number. - The difference is a fixed offset to allow transceiver 250 sufficient time to respond to changes in allocation. |

TABLE 4-continued

Bandwidth Allocation Packet (BAP) Format

| Bits | Field | Description/Notes |
|---|---|---|
| Nx24 | Burst Allocation | This is preferably a list of all the burst allocations for each Inroute. It may order all the bursts in a Frame, and then may repeat a Frame for each Inroute in the Group. It is preferably limited to no more than 489 entries, since IP Datagrams are preferably limited to 1500 bytes. This could be important, as this is a Linear search for transceiver 250. A malformed Burst Allocation Table may degrade of the Network, as there preferably is limited error checking on this field. The value of N may be derived from the length of the IP Datagram. See Table 4a. |

TABLE 4a

Burst Allocation Record Format

| Bits | Field | Description/Notes |
|---|---|---|
| 16 | AssignID | This is a unique identifier which may be used to indicate which remote user 240 the bandwidth was allocated to. The value of 0 may be used to indicate small ALOHA, i.e. bandwidth request and backlog indicator only (and Non-allocated Ranging) bursts, and a value of 1 may be used to indicate large ALOHA bursts, i.e. backlog indicator and a maximum-sized length message. A value of 0xFFFF may be used to indicate bandwidth that is not assigned. Other values may be dynamically assigned, however, there is nothing to preclude RCS 510 from imposing other reserved values, or structure on these values. |
| 1 | Ranging | This could indicate whether the burst is allocated for normal or Ranging bursts. Preferably, while transceiver 250 is ranging, it will still be able to send encapsulated datagrams over the inroute, and an active remote user 240 may have ranging turned on/off to test or fine tune its values, with minimal impact on performance. |
| 6 | Burst Size | Size (in Slots) of this burst, and may include the aperture and Burst Overhead. |

TABLE 5

Inroute Acknowledgement Packet (IAP)

| Bits | Field | Description/Notes |
|---|---|---|
| 8 | Frame Type | A value of 4 could indicate an Inroute Acknowledgement Packet |
| 16 | Frame Number | This may indicate the frame number for which the acknowledgement applies, and should be less than the current Frame Number. |
| N | ACK | This field is a bitmap that matches the entries for this Frame in the Burst Allocation table of the BAP. To determine what was acknowledged, RCVR 410 must determine which bursts were assigned to itself from the BAP, and remember what data was transmitted during those bursts. The value of N may be derived from the length of the IP Datagram, and could match the value of N from the associated BAP. |

TABLE 6

Inroute Packet Format (Non-Allocated)

| Bits | Field | Description/Notes |
|---|---|---|
| 16 | SerNr | This is the Serial Number of RCVR 410/XCVR 250, for example, or other unique remote user identifier. |
| 1 | Backlog Indicator | This indicates the presence of the Backlog field. This preferably should always be present for ALOHA and Non-allocated Ranging bursts, unless there is no backlog. |
| 2 | Frame Number | This is the 2 least significant bits of the frame number, and will help RCS 510 to determine which burst was received. |
| 4 | BurstNr | This indicates which burst slot in the Frame this was transmitted in, and helps to identify a burst as being an ALOHA type burst. |
| 8 | Length FEC | This is the FEC value for the length produced via table lookup in software. |
| 8 | Length | This is the length of the burst. It includes all the bytes starting with the Backlog Indicator field through the CRC. |
| 8 | Backlog | This field may be used to indicate the number of bytes of Backlog that are present and is preferably encoded as a floating point number with a 2 bit exponent field and a 6 bit mantissa, for example, and may be rounded up by TU 450. |
| Nx8 | Encapsulated Datagrams | This may contain 0 or more bytes of encapsulated datagrams. There preferably is no relationship between IP Datagram boundaries and the contents of this field, i.e., this field can contain a section of an IP Datagram, or multiple IP Datagrams. The value of N can be derived by subtracting the size of the other fields in the packet from the Length. |
| 16 | CRC | This is the burst required CRC field. A burst with an invalid CRC is dropped, and statistics are retained. |

TABLE 7

Inroute Packet Format (Allocated)

| Bits | Field | Description/Notes |
|---|---|---|
| 16 | SerNr | This is the Serial Number of RCVR 410/XCVR 250, for example, or other unique remote user identifier. |
| 1 | Backlog Indicator | This indicates the presence of the Backlog field. |
| 2 | Frame Number | This is preferably the 2 least significant bits of the frame number, and will help RCS 510 to determine which burst was received. |
| 4 | BurstNr | This indicates which burst slot in the Frame this was transmitted in. With the addition of the Inroute and Frame number it was received on, RCS 510 will be able to uniquely identify the source and destination. |
| 8 | Length FEC | This is the FEC value for the length produced via table lookup in software. |
| 8 | Length | This is the length of the burst. It includes all the bytes starting with the Backlog Indicator field through the CRC. |
| 8 | Backlog | This field may be used to indicate the number of bytes of Backlog that are present and is preferably encoded as a floating point number with a 2 bit exponent field and a 6 bit mantissa, for example, and may be rounded up by TU 450. |
| Nx8 | Encapsulated Datagrams | This may contain 0 or more bytes of encapsulated datagrams. There preferably is no relationship between IP Datagram boundaries and the contents of this field, i.e., this field can contain a section of an IP Datagram, or multiple IP Datagrams. The value of N can be derived by subtracting the size of the other fields in the packet from the Length. |

TABLE 7-continued

Inroute Packet Format (Allocated)

| Bits | Field | Description/Notes |
|------|-------|-------------------|
| 16 | CRC | This is the burst required CRC field. A burst with an invalid CRC is dropped, and statistics are retained. |

What is claimed is:

1. A communication system for balancing traffic on a plurality of return channels, comprising:
  a control station to transmit a broadcast signal to a remote user,
  said broadcast signal including a non-real time frame marker, a timing message, and a return channel control message;
  a receiver at the remote user to receive the broadcast signal and determine a return channel frame start time using the non-real time frame marker and the timing message; and
  a transmitter at the remote user to uplink a user message on one return channel of the plurality of return channels during a predetermined period after the return channel frame start time, wherein an uplink frequency of said one return channel is determined by the return channel control message.

2. The communication system of claim 1, wherein a bandwidth of said one return channel is determined by the return channel control message.

3. The communication system of claim 1, further comprising a return channel controller in the control station, said return channel controller providing the return channel control message.

4. The communication system of claim 3, wherein the return channel controller further provides a bandwidth allocation message in the broadcast signal which sets a bandwidth of said one return channel.

5. The communication system of claim 4, wherein the bandwidth of said one return channel is set based on a predicted load factor.

6. The communication system of claim 3, wherein the bandwidth of said one return channel is set by evaluating a user backlog indicator transmitted by the remote user to the control station.

7. The communication system of claim 6, wherein the bandwidth of said one return channel is set to a stream bandwidth.

8. The communication system of claim 6, wherein the uplink frequency of said one return channel is set to a dedicated frequency based on an evaluation of the user backlog indicator.

9. The communication system of claim 3, wherein the return channel controller changes the uplink frequency to a different frequency within a first return channel group.

10. The communication system of claim 3, wherein the return channel controller changes the uplink frequency to a different frequency within a second return channel group.

11. The communication system of claim 10, wherein the return channel controller changes the uplink frequency to a different frequency based on a system load factor.

12. The communication system of claim 1, wherein a bandwidth of said one return channel is determined by a bandwidth allocation request included in the user message uplinked by the remote user.

13. The communication system of claim 12, wherein the user message is an ALOHA-type burst transmission.

14. The communication system of claim 13, wherein the user message includes the bandwidth allocation request and an additional user message, said additional user message having a size less than a predetermined threshold size.

15. The communication system of claim 1, wherein said broadcast signal is an asynchronous DVB transport stream.

16. The communication system of claim 1, further comprising a plurality of remote users sharing the plurality of return channels and a return channel controller, wherein the return channel controller controls the uplink frequency of each of the plurality of return channels through the return channel control message.

17. The communication system of claim 16, wherein said return channel controller controls a bandwidth allocation for each of the plurality of return channels.

18. The communication system of claim 16, wherein a subset of the plurality of return channels are ALOHA burst channels, and wherein said return channel controller shifts a remote user uplink from an ALOHA burst channel to a non-ALOHA burst channel in accordance with the return channel control message.

19. The communication system of claim 18, wherein the ALOHA burst channel is selected from the subset of the plurality of return channels by the remote user using a random weighted frequency selection criteria.

20. The communication system of claim 18, wherein said non ALOHA burst channel is selected by the control station using a group load factor.

21. The communication system of claim 1, wherein said broadcast signal is encapsulated in an IP/DVB protocol layer.

22. The communication system of claim 1, further comprising a communication satellite to relay the transmitted broadcast signal to the receiver.

* * * * *